W. J. CHISM.
NUT LOCK.
APPLICATION FILED DEC. 16, 1919.
1,421,127.
Patented June 27, 1922.
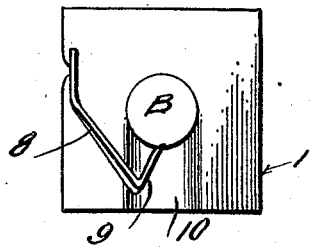
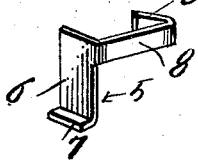
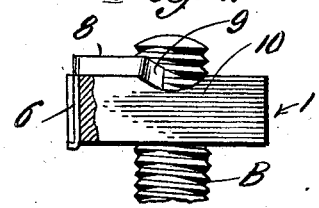
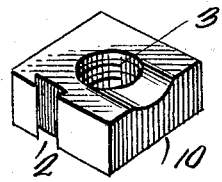
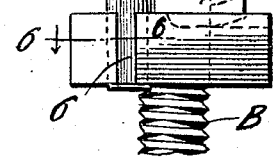
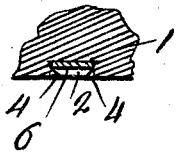
WITNESSES
Inventor
WILLIAM J. CHISM
By
Attorney

UNITED STATES PATENT OFFICE.

WILLIAM J. CHISM, OF CLEVELAND, OHIO.

NUT LOCK.

1,421,127. Specification of Letters Patent. Patented June 27, 1922.

Application filed December 16, 1919. Serial No. 345,391.

*To all whom it may concern:*

Be it known that I, WILLIAM J. CHISM, a subject of the King of Great Britain, residing at Cleveland, in the county of Cuyahoga and State of Ohio, have invented certain new and useful Improvements in a Nut Lock, of which the following is a specification.

This invention relates to improvements in nut locks, and the preliminary object of the invention is to provide a nut lock adapted to be positioned on the conventional type of bolts, and which has means to lock the nut in position on said bolt without injuring either the bolt or the nut.

Another object of the invention is to provide a device of this character, which is easily and simply constructed, inexpensive to manufacture, and which will be very efficient in operation, the expansion and contraction caused by heat and cold not in anyway affecting it.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents an end elevation of a bolt having a nut mounted thereon equipped with this invention.

Fig. 2 is a side elevation partly in section.

Fig. 3 is a similar view taken in a plane at right angles to Fig. 2.

Fig. 4 is a detail perspective view of the locking pawl, detached.

Fig. 5 is a similar view of the nut; and

Fig. 6 is a detail horizontal section taken on line 6—6 of Fig. 3.

In the embodiment illustrated, a conventional type of bolt B is shown in connection with which the nut 1 equipped with this improved lock is employed. This nut 1 has a central bore 3 and groove 2 extending transversely across one side face thereof, the walls 4 of which are undercut, and which is designed to receive a locking pawl 5. This locking pawl 5 is composed of a flat spring metal strip and is in the form shown in Fig. 4 being substantially L-shaped or in the form of a carpenter's square, with the short arm 6 positioned in groove 2 and secured therein by clinching down thereon the overhanging walls 4 of the groove. The free end of this arm 6 has an out-turned lip 7 which is designed to extend under the rear ends of the overhanging walls 4 of the groove when said walls are hammered or clinched down on arm 6, so that the pawl is reliably secured to the nut. The other arm 8 of said pawl lies on the outer face of the nut 1 with its free end bent inward to form a spur 9 which is positioned in a recess 10 in the front face of the nut so that said spur 9 will catch the first two threads of a short bolt that will not reach farther than the outside face of the nut as shown in Fig. 1. This thread engaging biting finger or spur 9 which extends toward the bore in the nut projects into said bore a slight distance.

When the nut is screwed on to the bolt a sharp blow will be struck on the free end of the arm 8 to force said spur 9 into biting engagement with the bolt, the spur forming a notch in the threads of the bolt to hold it engaged therewith. The left side of the said notch is straight or perpendicular so that the lower end of the spur 9 will not slide out of it. And the right side of the said notch slopes at about a one-half inch pitch which is complemental with Figure 8 in configuration to the free terminal of the spur which engages in the notch.

It will thus be seen that a nut equipped with the locking pawl 5 herein described, is very simple in construction and cheap to manufacture, and may be placed in operative engagement with a bolt to prevent backward turning of the nut by forcing the spur 9 into the threaded end of the bolt as above set forth and by locating spur 9 in recess 10 of the nut this spur will engage the threads of a bolt which does not project beyond the front face of the nut.

To remove the nut the arm 8 must be lifted until spur 9 is released from the notch which it has formed in the threads of the bolt and then turn the nut to the left to unscrew it.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:

A nut and bolt lock, in combination with a nut having a dove tail groove extending transversely therethrough adjacent its outer surface and opening through said outer surface, an integral plate consisting of an oblong body arranged in the groove and having one of its terminals bent at right angles to engage the inner face of the nut, a portion of one margin of the plate, above said nut, being extended across the outer face of the nut and engaged therewith, the free terminal of the extended portion being bent at right angles and engaged with the threads of the bolt substantially as described.

In testimony whereof I affix my signature in presence of two witnesses.

WILLIAM J. CHISM.

Witnesses:
RUTH ARING,
PLACEDA KLEIN.